United States Patent
Bae (10) Patent No.: US 7,596,382 B2
(45) Date of Patent: Sep. 29, 2009

(54) MOBILE TERMINAL FOR MANAGING SCHEDULE AND METHOD THEREFOR

(75) Inventor: Jeong-Min Bae, Hanam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/327,404

(22) Filed: Jan. 9, 2006

(65) Prior Publication Data

US 2007/0072629 A1 Mar. 29, 2007

(30) Foreign Application Priority Data

Sep. 29, 2005 (KR) .................. 10-2005-0091635

(51) Int. Cl.
*H04Q 7/20* (2006.01)
(52) U.S. Cl. .............. 455/461; 455/566; 455/556.2; 455/517; 455/412; 455/463; 705/8; 718/103
(58) Field of Classification Search ............ 455/556.2, 455/566, 463, 517, 461; 707/102; 705/8; 718/103; 715/772, 963
See application file for complete search history.

(56) References Cited

U.S. PATENT DOCUMENTS

| | | | | |
|---|---|---|---|---|
| 6,411,827 B1 * | 6/2002 | Minata | ...................... | 455/566 |
| 6,792,280 B1 * | 9/2004 | Hori et al. | .................... | 455/517 |
| 7,370,282 B2 * | 5/2008 | Cary | ........................... | 715/772 |
| 2003/0092453 A1 * | 5/2003 | Mills et al. | .................. | 455/463 |
| 2004/0053640 A1 * | 3/2004 | Kamata et al. | ........... | 455/556.2 |
| 2005/0108074 A1 * | 5/2005 | Bloechl et al. | ................. | 705/8 |
| 2005/0177591 A1 * | 8/2005 | Kanda et al. | ................ | 707/102 |
| 2006/0190943 A1 * | 8/2006 | Haeri | ........................ | 718/103 |

FOREIGN PATENT DOCUMENTS

| | | |
|---|---|---|
| CN | 1558646 A | 12/2004 |
| JP | 11-344584 A | 12/1999 |
| JP | 2002-073756 A | 3/2002 |
| JP | 2004-032596 A | 1/2004 |
| JP | 2004-054833 A | 2/2004 |
| JP | 2004-061236 A | 2/2004 |

OTHER PUBLICATIONS

Fukuzumi, Mamoru, Intanetto de teni ireru Windows onrain sofuto no sekai (The World of Online-Softwares for Windows Obtained on the Internet), Japan: Softbank Publishing Inc. PC User, vol. 9, No. 6, p. 102.

* cited by examiner

*Primary Examiner*—Charles N Appiah
*Assistant Examiner*—Michael T Vu
(74) *Attorney, Agent, or Firm*—Birch, Stewart, Kolasch & Birch, LLP (57) ABSTRACT

A mobile terminal for managing a schedule and a method therefor are discussed. According to an embodiment, the mobile terminal includes a storage unit to store schedule notification information including at least one notification time information assigned to each of a plurality of priority levels, and a control unit to receive information of an event from a user and to control execution of a notification operation of the event according to the at least one notification time information assigned to one of the priority levels that corresponds to the information of the event.

33 Claims, 4 Drawing Sheets

| Priority | Event List | 1st Notification | 2nd Notification | 3rd Notification | 4th Notification | 5th Notification |
|---|---|---|---|---|---|---|
| High | -Father's Birth<br>-Mother's Birth<br>-Girlfriend's Birth<br>⋮ | 9am<br>10 days before | 9am<br>5 days before | 9am<br>2 days before | 10am<br>1 day before | 9am<br>on the day of event |
| Normal | -Sibling's Birth<br>-Wedding<br>-Reunion<br>⋮ | 9am<br>7 days before | 9am<br>3 days before | 10am<br>1 day before | 9am<br>on the day of event | X |
| Low | -Appointment with friend<br>-Meeting<br>⋮ | 10am<br>1 day before | 9am<br>on the day of event | X | X | X |

| Priority | 1st Notification | 2nd Notification | 3rd Notification | 4th Notification | 5th Notification | 6th Notification |
|---|---|---|---|---|---|---|
| Very High | 9am 15 days before | 9am 7 days before | 9am 3 days before | 9am 2 days before | 9am 1 day before | 9am on the day of event |
| High | 9am 10 days before | 9am 5 days before | 9am 2 days before | 9am 1 day before | 9am on the day of event | X |
| Medium High | 9am 5 days before | 9am 2 days before | 9am 1 day before | 9am on the day of event | X | X |
| Normal | 9am 3 days before | 9am 1 day before | 9am on the day of event | X | X | X |
| Low | 9am on the day of event | X | X | X | X | X |

| Priority | Event List | 1st Notification | 2nd Notification | 3rd Notification | 4th Notification | 5th Notification |
|---|---|---|---|---|---|---|
| High | -Father's Birth<br>-Mother's Birth<br>-Girlfriend's Birth<br>⋮ | 9am 10 days before | 9am 5 days before | 9am 2 days before | 10am 1 day before | 9am on the day of event |
| Normal | -Sibling's Birth<br>-Wedding<br>-Reunion<br>⋮ | 9am 7 days before | 9am 3 days before | 10am 1 day before | 9am on the day of event | X |
| Low | -Appointment with friend<br>-Meeting<br>⋮ | 10am 1 day before | 9am on the day of event | X | X | X |

MOBILE TERMINAL FOR MANAGING SCHEDULE AND METHOD THEREFOR

This application claims, under 35 U.S.C. §119, the priority benefit of the Korean Patent Application No. 10-2005-0091635 filed on Sep. 29, 2005 in Republic of Korea, the entire contents of which are hereby fully incorporated by reference.

BACKGROUND OF THE INVENTION

1. Field of the Invention

The present invention relates to a mobile terminal, and particularly, to a mobile terminal for managing a schedule and a method therefor.

2. Description of the Related Art

As mobile terminals are increasingly being used more commonly, the number of people who use their mobile terminals for the purpose of managing their time schedules instead of using electronic watches or electronic schedulers is also increasing.

When managing schedule information with the related art mobile terminal, a user should manually set not only his schedule information (identification of event and event date, etc.) but also a notification time identifying when the user should be notified about the user's scheduled event. Particularly, the user has to manually set the reminder alarm to a proper initial time and the repetition period of the alarm, such as 'remind every 5 minutes' or 'remind every 30 minutes'.

However, in reality, a user's preferred reminder times for certain events such as birthdays and anniversaries, may not always be known or clear and the user may be forced to randomly enter the reminder time information in those situations to receive any reminder. For example, preparation for an upcoming birthday party or other special event can require one, two, three, or four weeks. Thus in those cases, the user is not sure when the user should receive the reminders because the user may not necessarily know how long the preparation may take. However, to receive a reminder, the user still has to manually enter each desired notification information (e.g., alarm start date, alarm end data, etc.) and manually set the repetition period of the reminder. The user is then forced to randomly select a notification time for a reminder which may turn out to be an ineffective or useless reminder to the user.

Also, the manner in which the user has to set and activate his notification operation is complicated and time consuming in the related art mobile terminal since it requires a large number of data selections and entries using multiple menus.

Thus, in managing the schedule information with the related art mobile terminal, the user needs to perform complicated and time consuming input operations to receive a notification. Also, even when the specific notification time information for a specific scheduled event is not clear, the user still has to enter the details of the notification time information and thus the notification eventually received may not be helpful. Thus a more user friendly and effective schedule management process is needed for use in the mobile terminal or the like.

BRIEF DESCRIPTION OF THE INVENTION

Therefore, an object of the present invention is to provide a mobile terminal and method for managing a schedule according to priority.

Another object of the present invention is to provide a mobile terminal and method for managing a schedule, which overcome the problems and limitations associated with the related art.

To achieve these and other advantages and in accordance with the purpose of the present invention, as embodied and broadly described herein, there is provided according to an embodiment of the present invention a mobile terminal comprising: a storage unit to store schedule notification information including at least one notification time information assigned to each of a plurality of priority levels; and a control unit to receive information of an event from a user and to control execution of a notification operation of the event according to the at least one notification time information assigned to one of the priority levels that corresponds to the information of the event.

According to another aspect of the present invention, there is provided a method for performing a schedule management function using a mobile terminal, the method comprising: receiving a date, contents, and a priority of an event from a user; and performing a notification operation at a time preset according to the priority of the event.

According to another aspect of the present invention, there is provided a method for performing a schedule management function using a mobile terminal, the method comprising: receiving a date and type of an event to be managed from a user; and performing a notification operation at a time preset according to priority corresponding to the type of the event.

According to another aspect of the present invention, there is provided a mobile communication terminal comprising: a transceiver to receive current time information from a mobile communication network; a storage unit to store an event for a user; an output unit to remind the user of the event; and a processor cooperating with the transceiver, the storage unit, and the output unit, so as to allow the user to set a type or priority level of the event, and to provide at least one reminder through the output unit at certain time periods related to the set type or priority level of the event upon comparison with the received current time information.

According to another aspect of the present invention, there is provided a mobile terminal comprising: a storage unit to store schedule notification information preset during a manufacturing stage of the mobile terminal, the schedule notification information including a plurality of different priority levels and at least one notification time information assigned to each of the priority levels; and a control unit to control at least one notification operation to notify a user of an event according to the stored schedule notification information.

According to another aspect of the present invention, there is provided a mobile terminal for managing a schedule, the mobile terminal comprising: an input unit to receive a date of an event and either a priority or type of the event to be managed; and a controller to automatically generate at least one notification of the event based on the received date of the event and the received priority or type of the event.

According to another aspect of the present invention, there is provided a computer program product embodied on at least one computer-readable medium, for performing a schedule management function using a mobile terminal, the computer program product comprising computer-executable instructions for: receiving a date, contents, and a priority of an event from a user, and performing a notification operation at a time preset according to the priority of the event.

According to another aspect of the present invention, there is provided a computer program product embodied on at least one computer-readable medium, for performing a schedule management function using a mobile terminal, the computer program product comprising computer-executable instructions for: receiving a date and type of an event to be managed from a user, and performing a notification operation at a time preset according to priority corresponding to the type of the event.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, events include, but are not limited to, activities/dates such as parties, birthdays, anniversaries, trips, etc.; tasks to perform such as picking up dry cleaning or groceries, preparing for a lecture, paying bills, etc.; various appointments; and so on. In fact, any item/information that the user wishes to be reminded of can be considered an event.

Figure 1:
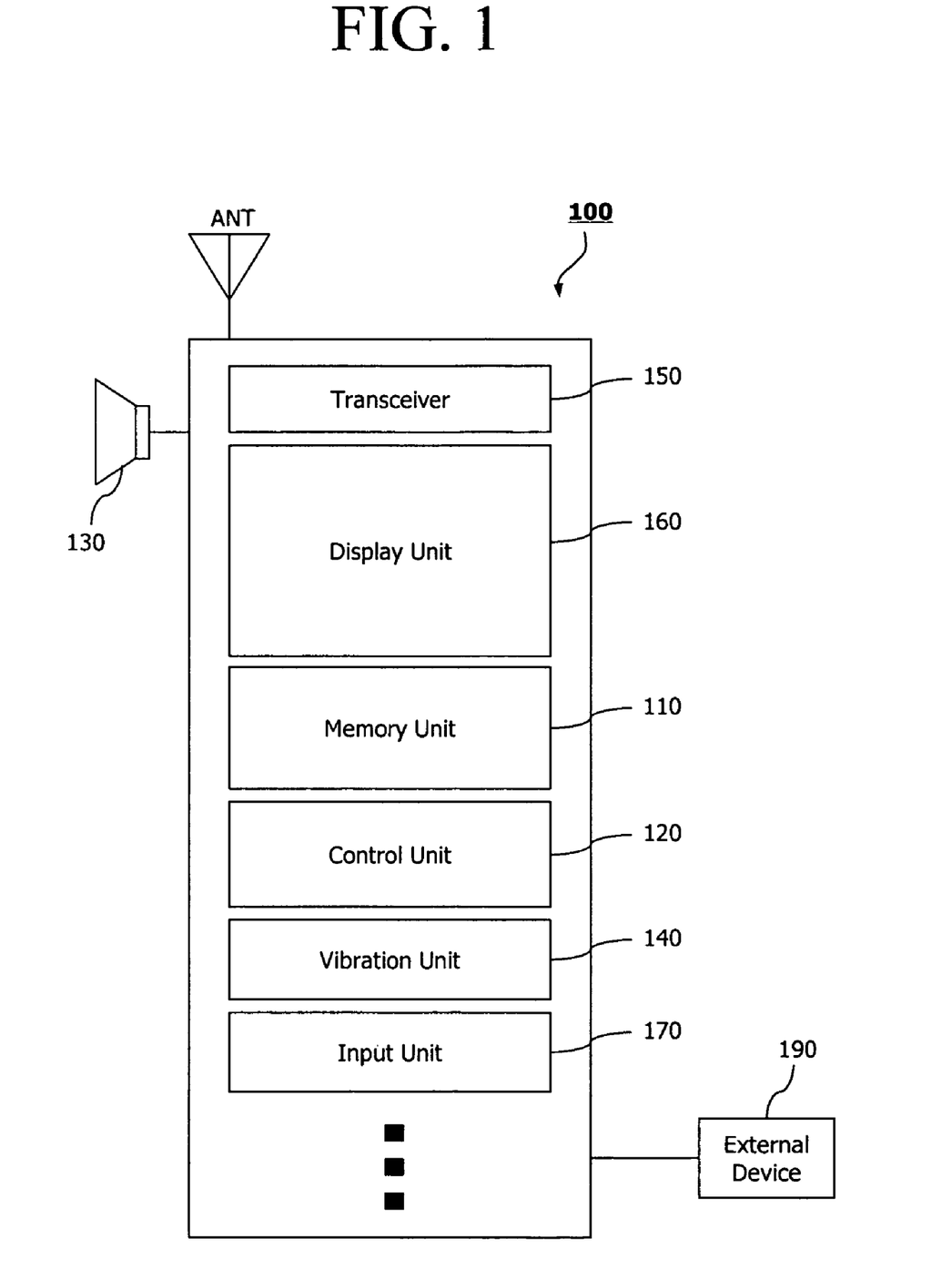
FIG. 1 is a view that illustrates a construction of a mobile terminal for managing a schedule in accordance with an embodiment of the present invention.

FIG. 1 is a view that illustrates a construction of a mobile terminal 100 for managing a schedule in accordance with an embodiment of the present invention. The mobile terminal 100 can be a mobile phone, a PDA, etc.

As shown in FIG. 1, the mobile terminal 100 may include a memory unit (or storage) 110 for storing schedule notification information set according to priority (i.e., degree of relative importance of an event), a control unit 120 for allowing a notification operation (e.g., an alarm or other type of indication/alerting means) set by the user or for allowing a notification operation to be performed at a particular time set according to the schedule notification information, and a speaker unit 130 and a vibration unit 140 for respectively outputting sounds and vibrations under the control of the control unit 120. The mobile terminal 100 can be connected to an external device/source 190 such as a mobile terminal, a PDA, a PC, a server via a network, etc. to perform synchronization of certain information or to download certain information.

Also, the mobile terminal 100 may include a transceiver 150 that transmits a synchronization signal (and other appropriate signals) and receives a satellite signal including current time information (e.g., date, hour, minute) and other signals, at least one display unit 160 (e.g., an LCD, an OLED, a plasma display, etc.) that displays notification contents at the time of the notification operation, and an input unit 170 for receiving a user's input such as schedule information, e.g., event, event date, selection of event priority, selection of event type, etc. The transceiver 150 can receive the current time information periodically or as needed from a mobile communication network or other source. The input unit 170 may be a keypad, an electronic stylus, buttons, etc. All the components of the mobile terminal 100 are operatively. Other conventional features and components of a conventional mobile terminal may also be included in the mobile terminal 100.

The memory unit 110 may be used to store schedule notification information that is set according to priority, and the user's inputs. The schedule notification information can be in a table or other format, and can be preset and prestored in the memory unit 110. Two different examples of such schedule notification information in a table format will now be described with reference to FIGS. 2 and 3.

Figure 2:
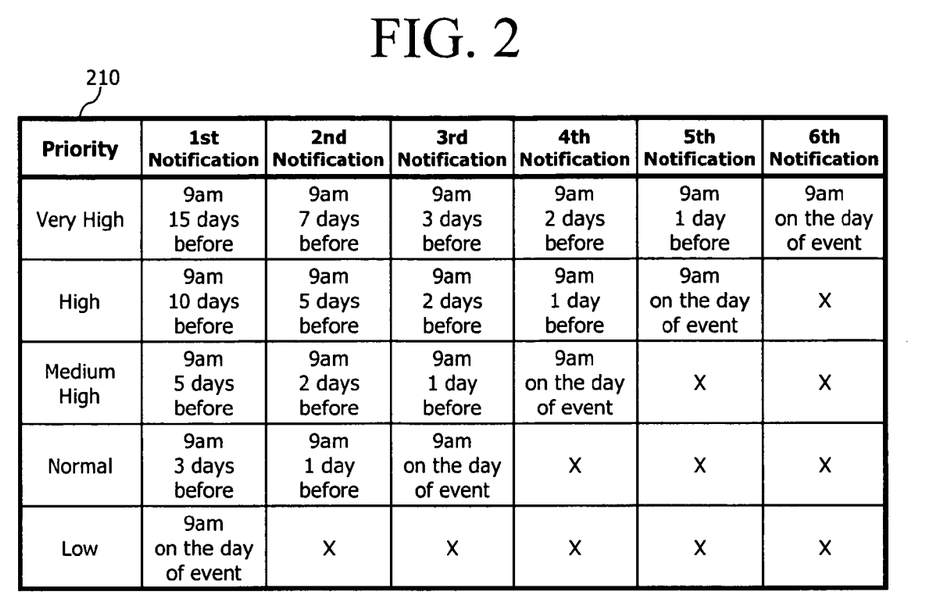
FIG. 2 is an example of a table containing schedule notification information set according to priority in accordance with a first embodiment of the present invention.
Figure 3:
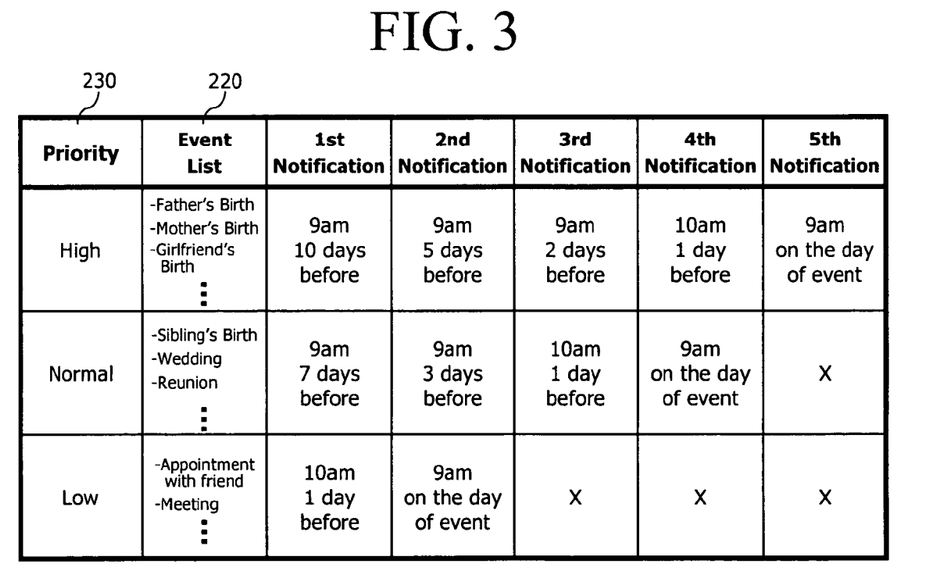
FIG. 3 is an example of a table containing schedule notification information set according to priority in accordance with a second embodiment of the present invention.

FIG. 2 is a diagram that shows one example of schedule notification information set according to priority in accordance with the first embodiment of the present invention, and FIG. 3 is a diagram that shows another example of schedule notification information set according to priority in accordance with the second embodiment of the present invention. For each of FIGS. 2 and 3, the schedule notification information is stored in the memory unit 110 of the mobile terminal 100, and the control unit 120 accesses this schedule notification information to automatically generate notifications (alerts) to the user about scheduled events according to the schedule notification information. Each notification can be in the form of at least one of a visual notification, an audible notification, and a tactile notification. It should be understood that the tables in FIGS. 2 and 3 are only examples and the invention covers other examples and variations.

Referring to FIG. 2, according to the schedule notification information, if a scheduled event is considered to be very important according to its priority (e.g., 'Very High' priority), a notification is made automatically, for example, at 9 o'clock a.m. on 15 days, 7 days, 3 days and 1 day before the day of the event, and at 9 o'clock a.m. on the day of the event; if a scheduled event is considered to be fairly important according to its priority (e.g., 'High' priority), a notification is made automatically, for example, at 9 o'clock a.m. on 10 days, 5 days, 2 days and 1 day before the day of the event, and at 9 o'clock a.m. on the day of the event; and so on.

The table in FIG. 2 is a mere example used to describe some features of the present invention, and there are other implementation methods such as dividing the priority into 'high, normal, low'. Other degrees of priority may be implemented as well.

In another example, referring to FIG. 3, it can be seen that various possible events 220 may be divided according to priority and a first notification time (e.g., date and hour) and a notification repetition interval are varied according to the priority 230 similar to FIG. 2. The priority of the events and the first notification time and the notification repetition intervals according to the priority can be changed and set by a user. For example, the priority of an appointment with a friend may normally be considered to be low and is classified to have 'Low' priority in the stored schedule notification information table. However, if the appointment is to meet a particular friend whom the user has not seen for several years, the user may increase its priority to Normal or High in the stored schedule notification information. The schedule notification information of FIG. 3 identifies a plurality of different possible events 220, such as a girlfriend's birthday, a mother's birthday, a father's birthday, a wedding day, a wedding anniversary, an appointment with a friend, a class reunion, a birthday party for 1 year birthday, a certain task to do, etc. These events 220 are classified into groups of different priorities 230. Such assignment of a certain priority to each possible event can be performed in advance and prestored in the mobile terminal.

To generate schedule notification information such as the tables of FIGS. 2 and 3, priority levels, and the notification times and repetition intervals for each priority can be set during a manufacturing stage of the mobile phone, by an administrative operator of the mobile terminal, or by a system, e.g., by broadcasting a new table of schedule notification information or changes to the previously stored schedule notification information to the mobile terminal. The system here is a system that can control the mobile terminal, such as a base station. In other examples, the user can receive different event information and/or schedule notification information from the external device/source 190 such as an MP3 player, a PC, a server connected via a network (e.g., Internet, an extranet, an intranet, etc.) to download the information, etc. The first notification time (e.g., date and hour) and notification repetition intervals can be varied according to the priority of events. The repetition intervals for the high priority level can be set to be shorter than the repetition intervals for the lower priority level, such that the reminders for the high priority events are provided more often than the reminders for the low priority events.

Also even after the schedule notification information is set and stored, it can be changed by the user according to the user's preference or need. Here, changes may include addition, modification, and/or deletion. For instance, the notification time and the repetition interval for any of the priorities in the table of FIG. 2 can be changed by the user, manually, if desired, e.g., using the input unit 170 and menus displayed on the display unit 160.

The schedule notification information in FIGS. 2 and 3 can be respectively used in the methods for managing a schedule according to the first and second embodiments of the present invention. These methods are now discussed below in more detail referring to FIGS. 4 and 5 as being implemented in the mobile terminal 100 of FIG. 1 as an example only, but can be implemented in other device or system and in other examples of schedule notification information.

Figure 4:
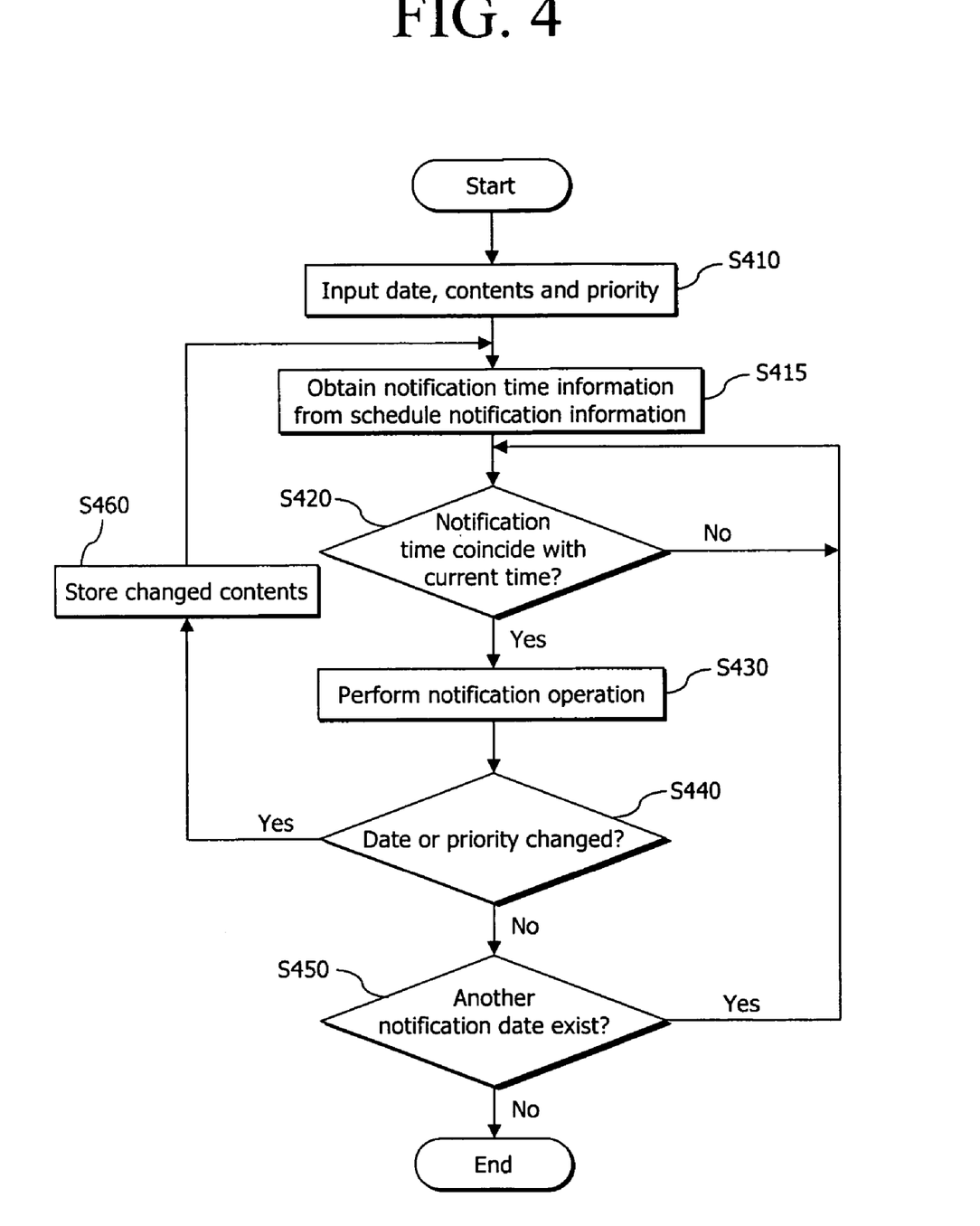
FIG. 4 is a flow chart that illustrates a method for managing a schedule in accordance with the first embodiment of the present invention.

FIG. 4 is a flow chart that illustrates a method for managing a schedule in accordance with the first embodiment of the present invention.

As shown in FIG. 4, when setting schedule information using the mobile terminal 100, the user inputs and stores in the mobile terminal 100 a date, the particulars (contents), and a priority of an event, which is to be part of a schedule being managed in the mobile terminal 100 (S410). This may be done using the input unit 170 and the memory unit 110. The priority of the event can be input, e.g., by selecting one of the prestored priorities identified in the schedule notification information stored in the memory unit 110. In the example of FIG. 2., the user determines which one of the listed priorities 210 in the schedule notification information would be most appropriate for the event being managed and selects that priority for the event being managed.

Then the mobile terminal 100 obtains notification time(s) for the input priority by referring to the schedule notification information (S415). The mobile terminal 100 determines whether any notification time (e.g., date and hour) identified in the prestored schedule notification information for the input priority coincides with a current time (e.g., date and hour) at predetermined time intervals (S420). For instance, if the user inputs/selects a normal priority ('Normal') for an event currently being managed, then the mobile terminal 100 refers to the schedule notification information of FIG. 2 and determines that 3 notifications (i.e., 9am on 3 days before the event date, 9am on 1 day before the event date, and 9am on the event date) are to be provided to the user for this event.

If the determination result at step S420 determines that any notification time identified in the stored schedule notification information for the input priority coincides with the current time, the mobile terminal executes a notification operation. The notification operation involves any means to alert the user of the scheduled event or some information associated with the event. This can be accomplished by, e.g., sounding an alarm or other sounds, causing the mobile terminal to vibrate using the vibration unit 140, flashing a visual indicator, displaying the contents of the schedule/event, etc. (S430). The manner in which the user may be notified can be selected or changed by the user and the mobile terminal 100 can be configured to provide the user with such selection mechanism.

The mobile terminal 100 determines whether the user has changed the date and/or the priority of the event being notified about (S440). If there is no change, the mobile terminal 100 determines whether another notification date/time is assigned for the current event (S450). If another notification date/time does not exist according to the schedule notification information, the time monitoring function for notifying the user about the event is completed. However, if another notification date/time does exist at step S450, the mobile terminal returns to step S420 and then performs appropriate subsequent steps. Namely, even after the first notification, subsequent notification(s) are performed automatically at the date intervals set in the schedule notification information for the input priority associated with the event being managed.

On the other hand, at step S460, if the user changes the date or the priority of the event being managed after the notification operation is performed at step S440, the mobile terminal stores the changed data (S460), applies the changed data to the method, and then performs the steps beginning from step S415 accordingly. Here, changes may include addition, modification, and/or deletion.

In this way, the user can receive appropriate advance notifications about a scheduled event from the mobile terminal, automatically, according to a priority of the event set by the user.

Figure 5:
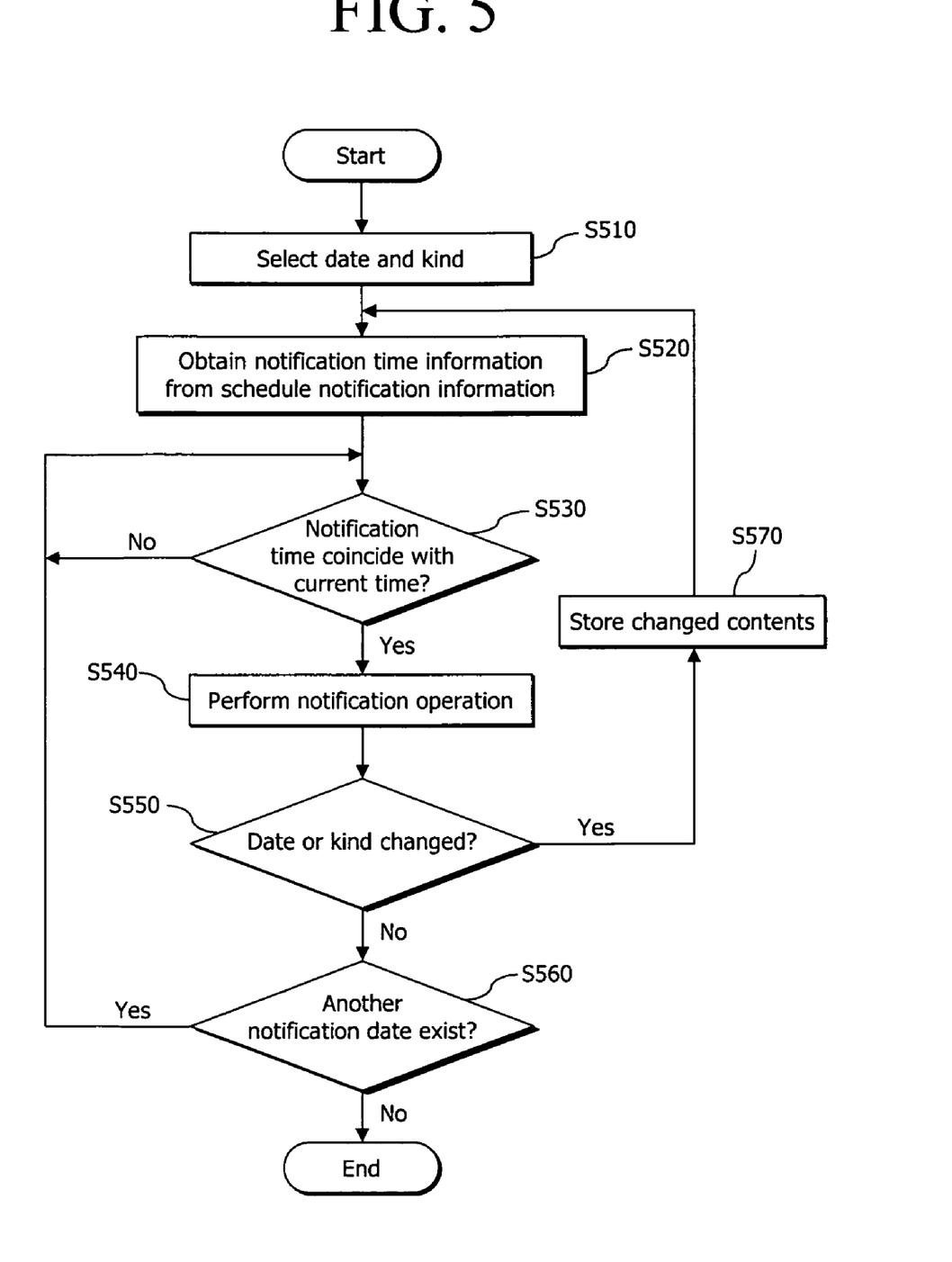
FIG. 5 is a flow chart that illustrates a method for managing a schedule in accordance with the second embodiment of the present invention.

FIG. 5 is a flow chart that illustrates a method for managing a schedule in accordance with the second embodiment of the present invention.

As shown in FIG. 5, if the user wishes to receive notifications about a certain event to manage his schedule, the user inputs/selects the date and type of the event in the mobile terminal 100 using the input unit 170 (S510). For instance, the user can select the date of the event from an electronic calendar on the mobile terminal 100, and can select one of the events identified in the event list 220 shown in FIG. 3. The event list 220 lists a plurality of possible events that can be selected by the user for management. If the event that the user is interested in managing is not listed, then the user may select a similar event of similar priority from the event list 220, or may manually add the event to the event list 220 under appropriate priority and select that event. Also the user may change the priority of any event in the event list 220 to tailor the schedule notification information in accordance with the user's situation or preference.

Then the mobile terminal 100 obtains the priority assigned to the selected event using the stored schedule notification information, and obtains notification time(s) (e.g., date and hour) assigned to the assigned priority based on the schedule notification information (S520).

Then the mobile terminal 100 determines whether any notification time assigned to the selected event corresponds to the current time at a predetermined time interval (S530).

If the determination result at step S530 determines that any notification time identified in the stored schedule notification information for the selected event coincides with the current time, the mobile terminal executes a notification operation (S540). This can be accomplished by, e.g., sounding an alarm or other sounds, causing the mobile terminal to vibrate using the vibration unit 140, flashing a visual indicator, displaying the contents of the schedule/event, etc. The manner in which the user may be notified can be selected by the user and the mobile terminal 100 can be configured to provide the user with such selection mechanism.

Then, the mobile terminal 100 may determine whether the user has changed the date and/or type of the event being managed (S550). If there is no change, the mobile terminal 100 determines whether another notification date/time is assigned for the current event (S560). If another notification date/time does not exist according to the schedule notification information, the time monitoring function for notifying the user about the event is completed. However, if another notification date/time does exist at step S560, the mobile terminal returns to step S530 and then performs appropriate subsequent steps. Namely, even after the first notification, subsequent notification(s) are performed automatically at the date/time intervals set in the schedule notification information for the input event type associated with the event being managed.

On the other hand, at step S550, if the user changes the date or type of the event being managed after the notification operation is performed at step S540, the mobile terminal 100 stores the changed data (S570), applies the changed data to the method, and then performs the steps beginning from step S520 accordingly. Here, changes may include addition, modification, and/or deletion.

The method(s) of the present invention can be implemented using existing computer programming language. Such computer program(s) may be stored in memories such as hard drive, RAM, ROM, PROM, etc. associated with computers or processors in a mobile terminal. Alternatively, such computer program(s) may be stored in a different storage medium such as a magnetic disc, optical disc, magneto-optical disc, memory stick, etc. Such computer program(s) may also take the form of a signal propagating across the Internet, extranet, intranet or other network and arriving at the destination device for storage and implementation. The computer programs are readable using a known computer or computer-based device.

Due to the particular characteristics of a mobile communication terminal, various aspects, such as mobility, limited processor capabilities, restricted memory size, restrictions on battery power consumption, a relatively small-sized display screen, etc., may need to be considered when implementing the present invention.

The present invention provides a more convenient schedule management operation that can minimize battery consumption and reduce the amount of processing and memory requirements by simplifying the features used when reminding the user of scheduled events.

As described thus far, the mobile terminal for managing a schedule and a method therefor according to the present invention are advantageous in that the notification operation is automatically performed at a proper time and at a proper interval upon the user's selection of only a event priority or event type, without the need for the user to set a specific notification time in setting a schedule.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a storage unit to store schedule notification information including at least one notification time information assigned to each of a plurality of priority levels; and
a control unit to receive information of an event from a user and to control execution of a notification operation of the event according to the at least one notification time information assigned to one of the priority levels that corresponds to the information of the event,
wherein a notification interval corresponding to a number of times the user is notified about the event is varied according to the priority levels,
wherein the user is notified a different number of times based on the priority levels, in which the user is notified a greater number of times for a higher priority level than for a lower priority level,
wherein a time interval between successive notifications continues to decrease until a last notification on a day of the event,
wherein the schedule notification information further includes a list of scheduled events grouped together in which each scheduled group of events is assigned to one of the plurality of priority levels, and
wherein a first notification occurs only "X" amount of days before the scheduled group of events, and a second successive notification occurs only "Y" amount of days before the scheduled group of events, where Y=INT(X/2) days.

2. The mobile terminal of claim 1, further comprising:
an indicator to perform the notification operation.

3. The mobile terminal of claim 2, wherein the indicator is one of the following:
a display unit to visually perform the notification operation;
an audio generating unit to audibly perform the notification operation; and
a vibration unit to perform the notification operation using vibration.

4. The mobile terminal of claim 1, further comprising:
a transceiver to receive current time information used to control the execution of the notification operation from a mobile communication network or a satellite network.

5. The mobile terminal of claim 1, wherein the at least one notification time information assigned to each of a plurality of priority levels includes a first notification time and the notification interval for the corresponding priority level.

6. The mobile terminal of claim 5, wherein the priority level, the first notification time, and the notification interval are changeable by the user.

7. The mobile terminal of claim 1, wherein the priority level, the first notification time, the notification interval, and the list of events are changeable by the user.

8. The mobile terminal of claim 1, wherein the schedule notification information is changeable by the user, by a system controlling the mobile terminal, or by connecting with an external device.

9. The mobile terminal of claim 1, wherein the notification interval is initially set without a user's selection.

10. A method for performing a schedule management function using a mobile terminal, the method comprising:
receiving a date, contents, and priorities of scheduled events grouped together from a user, each scheduled group of events being assigned to one of the priorities; and
performing a notification operation at a time preset according to a priority of a corresponding scheduled group of events and at a notification interval corresponding to a number of times that the user is notified about the corresponding scheduled group of events,
wherein the notification interval varies based on the priority of the corresponding scheduled group of events received from the user,
wherein the user is notified a different number of times based on the priority of the corresponding scheduled group of events, in which the user is notified a greater number of times for a higher priority than for a lower priority,
wherein a time interval between successive notifications continues to decrease until a last notification on a day of the event, and
wherein a first notification occurs only "X" amount of days before the corresponding scheduled group of events, and a second successive notification occurs only "Y" amount of days before the corresponding scheduled group of events, where Y=INT(X/2) days.

11. The method of claim 10, wherein the received date, contents, and priority of the corresponding group of events are changeable by the user.

12. The method of claim 10, wherein the time and notification interval are changeable by the user, by a system controlling the mobile terminal, or by connecting with an external device.

13. The method of claim 10, wherein the notification interval is initially set without a user's selection.

14. A method for performing a schedule management function using a mobile terminal, the method comprising:
receiving a date and types of events grouped together to be managed from a user, each type of scheduled grouped events being assigned to one priority among a plurality of priorities; and
performing a notification operation at a time preset according to a priority corresponding to a respective type of the scheduled grouped events and at a notification interval corresponding to number of times that the user is notified about the respective type of the scheduled grouped events,
wherein the notification interval varies based on the priority corresponding to the respective type of the scheduled grouped events received from the user,
wherein the user is notified a different number of times based on the priority corresponding to the respective type of the scheduled grouped events, in which the user is notified a greater number of times for a higher priority than for a lower priority,
wherein a time interval between successive notifications continues to decrease until a last notification on a day of the scheduled grouped events, and
wherein a first notification occurs only "X" amount of days before the scheduled grouped events, and a second successive notification occurs only "Y" amount of days before the scheduled grouped events, where Y=INT(X/2) days.

15. The method of claim 14, wherein the received date and type of the scheduled grouped events are changeable by the user.

16. The method of claim 14, wherein the time and notification interval are changeable by the user, by a system controlling the mobile terminal, or by connecting with an external device.

17. The method of claim 14, wherein the notification interval is initially set without a user's selection.

18. A mobile communication terminal comprising:
a transceiver to receive current time information from a mobile communication network or a satellite network;
a storage unit to store scheduled events grouped together for a user;
an output unit to remind the user of the scheduled events grouped together; and
a processor cooperating with the transceiver, the storage unit, and the output unit, so as to allow the user to set a type or priority level of the scheduled events grouped together, and to provide at least one reminder through the output unit at certain time periods related to the set type or priority level of the scheduled events grouped together, based on the received current time information,
wherein the certain time periods are varied based on the priority level of the scheduled events grouped together set by the user,
wherein the user is notified a different number of times based on the priority level of the scheduled events grouped together, in which the user is notified a greater number of times for a higher priority level than for a lower priority level,
wherein a time interval between successive notifications continues to decrease until a last notification on a day of the scheduled events grouped together, and
wherein a first notification occurs only "X" amount of days before the scheduled events grouped together, and a second successive notification occurs only "Y" amount of days before the scheduled events grouped together, where Y=INT(X/2) days.

19. The terminal of claim 18, wherein the output unit provides at least one of a visual, audible, and/or tactile notification to the user as the at least one reminder.

20. The terminal of claim 18, further comprising:
an input unit to allow the user to input the scheduled events grouped together, and to set the type or priority level of the scheduled events grouped together.

21. The terminal of claim 20, wherein the priority level is set as at least high or low, whereby the certain time periods of the high priority level have a shorter duration than the certain time periods of the low priority level.

22. The terminal of claim 18, wherein the certain time periods are initially set without a user's selection.

23. A mobile terminal comprising:
a storage unit to store schedule notification information including a plurality of different priority levels and at least one notification time information assigned to each of the priority levels; and
a control unit to control a notification operation to notify a user of an event according to the stored schedule notification information,
wherein the notification operation includes a notification interval corresponding to a number of times the user is notified about the event and that is varied according to the priority levels, wherein the user is notified a different number of times based on the priority levels, in which the user is notified a greater number of times for a higher priority level than for a lower priority level, wherein a time interval between successive notifications continues to decrease until a last notification on a day of the event, wherein the schedule notification information further includes a list of scheduled events grouped together in which each scheduled group of events is assigned to one of the plurality of priority levels, and wherein a first notification occurs only "X" amount of days before the scheduled group of events, and a second successive notification occurs only "Y" amount of days before the scheduled group of events, where Y=INT(X/2) days.

24. The mobile terminal of claim 23, wherein the control unit automatically generates notifications at the notification interval according to the at least one notification time information in the stored schedule notification information.

25. The mobile terminal of claim 24, wherein the notification interval at which the notifications are generated for the scheduled group of events change depending on a type of the event.

26. The mobile terminal of claim 23, wherein the schedule notification information is variable, manually, after the schedule notification information is preset.

27. The mobile terminal of claim 23, wherein the notification interval is initially set without a user's selection.

28. A mobile terminal for managing a schedule, the mobile terminal comprising:

an input unit to receive a date of a scheduled group of events and either a priority or type of the scheduled group of events to be managed; and a controller to automatically generate at least one notification of the scheduled group of events based on the received date of the scheduled group of events and the received priority or type of the scheduled group of events, wherein the at least one notification includes a plurality of notifications generated at certain time intervals that vary based on the priority of the scheduled group of events, wherein the user is notified a different number of times based on the priority of the scheduled group of events, in which the user is notified a greater number of times for a higher priority than for a lower priority, wherein a time interval between successive notifications continues to decrease until a last notification on a day of the scheduled group of events, and wherein a first notification occurs only "X" amount of days before the scheduled group of events, and a second successive notification occurs only "Y" amount of days before the scheduled group of events, where Y=INT(X/2) days.

29. The mobile terminal of claim 28, wherein the notification interval is initially set without a user's selection.

30. A computer program product embodied on at least one computer-readable medium, for performing a schedule management function using a mobile terminal, the computer program product comprising computer-executable instructions for:

receiving a date, contents, and priorities of scheduled events grouped together from a user, each group of scheduled events being assigned to one of the priorities; and performing a notification operation at a time preset according to a priority of a corresponding group of scheduled events and at a notification interval corresponding to a number of times that the user is notified about the corresponding group of scheduled events, wherein the notification interval varies based on the priority of the corresponding group of scheduled events received from the user, wherein the user is notified a different number of times based on the priority of the corresponding group of scheduled events, in which the user is notified a greater number of times for a higher priority than for a lower priority, wherein a time interval between successive notifications continues to decrease until a last notification on a day of the corresponding group of scheduled events, and wherein a first notification occurs only "X" amount of days before the corresponding group of scheduled events, and a second successive notification occurs only "Y" amount of days before the corresponding group of scheduled events, where Y=INT(X/2) days.

31. The computer program product of claim 30, wherein the notification interval is initially set without a user's selection.

32. A computer program product embodied on at least one computer-readable medium, for performing a schedule management function using a mobile terminal, the computer program product comprising computer-executable instructions for:

receiving a date and types of scheduled events grouped together to be managed from a user, each type of scheduled grouped events being assigned to one priority among a plurality of priorities; and performing a notification operation at a time preset according to a priority corresponding to a respective type of the scheduled grouped events and at a notification interval corresponding to a number of times that the user is notified about the respective type of scheduled grouped events, wherein the notification interval varies based on the priority corresponding to the respective type of scheduled grouped events received from the user, wherein the user is notified a different number of times based on the priority corresponding to the respective type of scheduled grouped events, in which the user is notified a greater number of times for a higher priority than for a lower priority, wherein a time interval between successive notifications continues to decrease until a last notification on a day of the scheduled grouped events, and wherein a first notification occurs only "X" amount of days before the scheduled grouped events, and a second successive notification occurs only "Y" amount of days before the scheduled group events, where Y=INT(X/2) days.

33. The computer program product of claim 32, wherein the notification interval is initially set without a user's selection.

* * * * *